Figure 1:
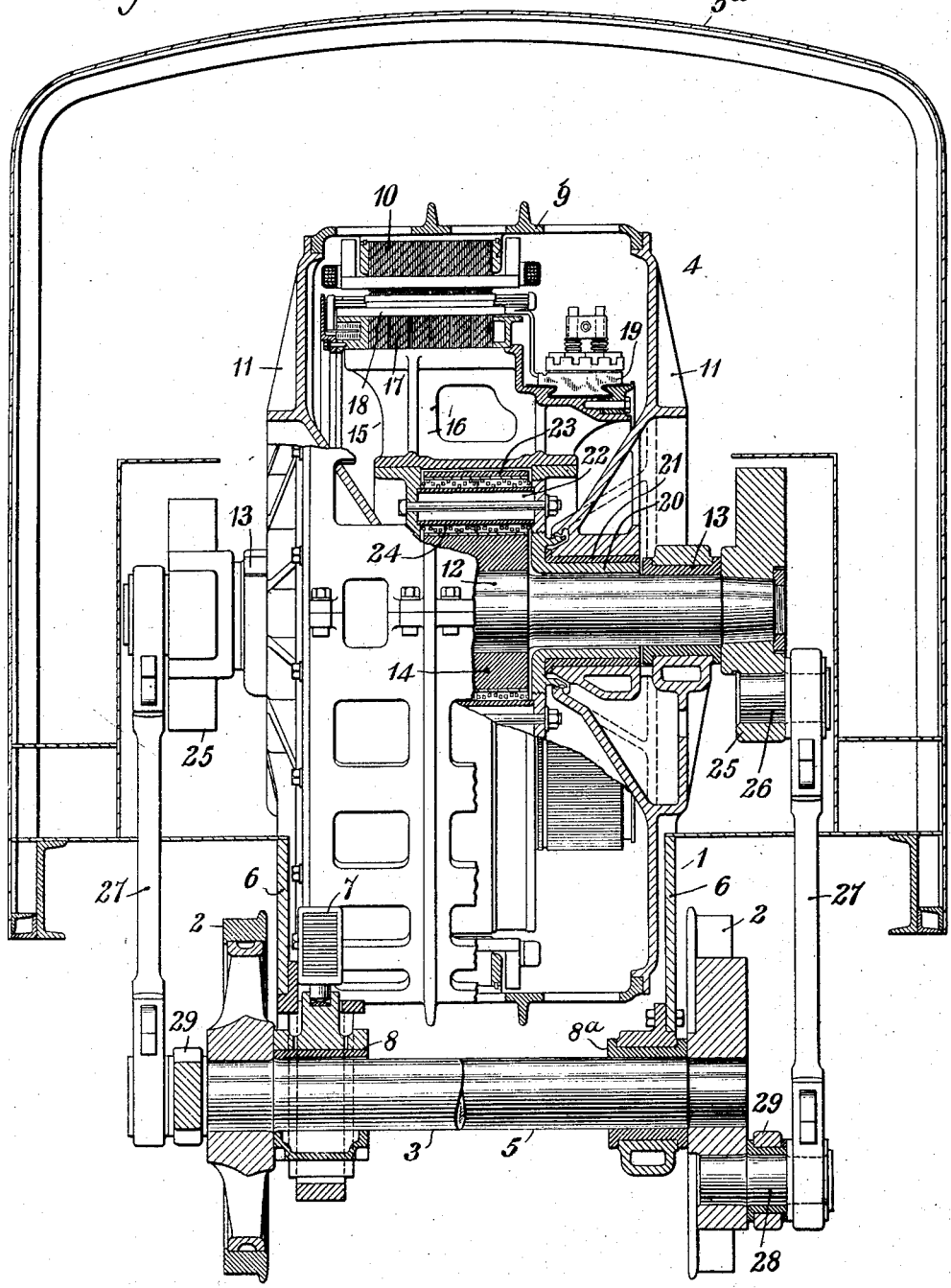

G. M. EATON.
ELECTRIC VEHICLE MOTOR AND MEANS FOR SUSPENDING THE SAME.
APPLICATION FILED SEPT. 8, 1908.

1,046,748.

Patented Dec. 10, 1912.

2 SHEETS—SHEET 2.

WITNESSES:
C. L. Belcher
R. J. Dearborn

INVENTOR
George M. Eaton
BY
ATTORNEY

UNITED STATES PATENT OFFICE.

GEORGE M. EATON, OF WILKINSBURG, PENNSYLVANIA, ASSIGNOR, BY MESNE ASSIGN-
MENTS, TO WESTINGHOUSE ELECTRIC & MANUFACTURING COMPANY, OF EAST
PITTSBURGH, PENNSYLVANIA.

ELECTRIC VEHICLE-MOTOR AND MEANS FOR SUSPENDING THE SAME.

1,046,748.   Specification of Letters Patent.   Patented Dec. 10, 1912.

Application filed September 8, 1908. Serial No. 452,096.

*To all whom it may concern:*

Be it known that I, GEORGE M. EATON, a citizen of the United States, and a resident of Wilkinsburg, in the county of Allegheny and State of Pennsylvania, have invented a new and useful Improvement in Electric Vehicle-Motors and Means for Suspending the Same, of which the following is a specification.
My invention relates to electrically propelled locomotives and other vehicles and it has special reference to the suspension of driving motors of very large capacity upon standard-gage trucks.
The object of my invention is to provide improved means for suspending an electric driving motor on the trucks of standard-gage locomotives which are capable of exerting a very strong draw bar pull and a suitable operative connection between the rotating part of the motor and the wheels of the truck from which it is suspended.

When it is desired to equip a locomotive with a few very powerful driving motors, the ordinary methods of m' jr suspension are found entirely inadequate on account of the large diameter of the motor frame relative to the diameter of driving wheels of ordinary dimensions.
According to my present invention I mount the stationary part of the motor entirely above the truck axles, which are provided with bearings for supporting said stationary member, and I connect the rotating part of the motor with the driving wheels by means of a jack shaft, crank pins and connecting rods. In order that a concentric relation may be maintained between the stationary and rotating parts of the motor for an indefinite length of time, I have provided two sets of bearings for the motor armature, one set being intended merely to maintain the desired relation, as above indicated, without reference to the wear which may occur in the second set which are adapted to receive the thrust caused by the re-action of the connecting rods during the operation of the motor. The rotating part of the motor is connected to the driving shaft by a yielding connection and the stationary part is associated with the rotating part by bearings, as above indicated, so that considerable relative movement between these parts and the driving shaft is permitted. The flexible connection serves to largely absorb the torque variations resulting from the use of single-phase alternating current energy of low frequency as a propelling force in the motor. As long as the two sets of bearings above referred to are concentric, the relative movement between the shaft and the parts of the motor is entirely confined to a rotary adjustment but, as the outer bearings are worn, the driving shaft may oscillate to a greater or less degree without causing any vibration in the motor paths.

The structural details which I prefer to employ are illustrated in the accompanying drawings and will be more fully pointed out hereinafter.

Figure 2:
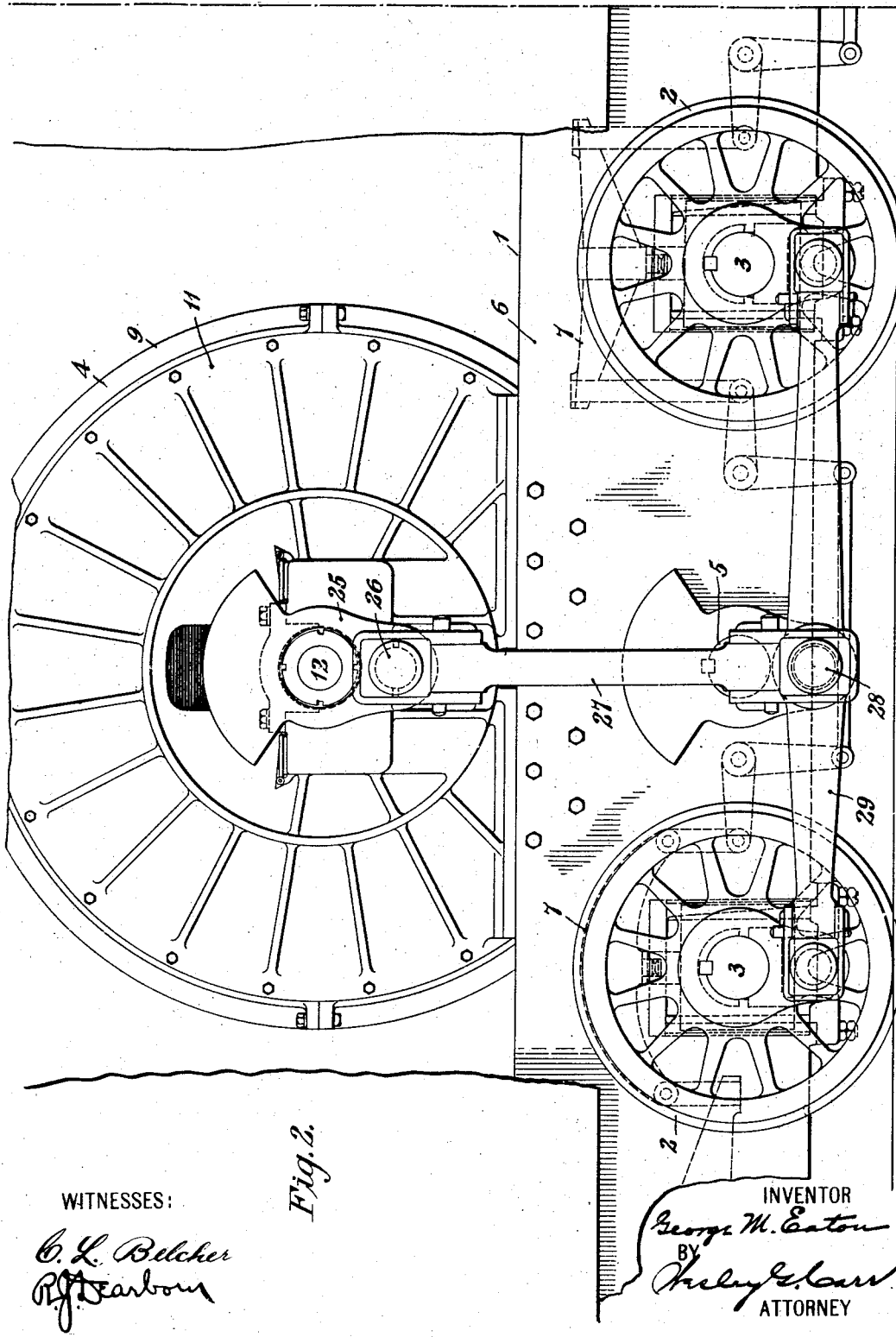

Figure 1 of the accompanying drawing is a sectional elevation, in a vertical plane parallel to the motor axes, of a locomotive which is equipped with a driving motor constructed and suspended in accordance with my invention. Fig. 2 is a side elevation of the apparatus shown in Fig. 1.

Referring to the drawings, the device here illustrated comprises a truck frame 1 and wheels 2 mounted on an axle 3, a driving motor 4 which is operatively connected to the truck wheels through a jack shaft 5 and a cab 5ª which forms a covering over the motor and partially incloses it.

The truck frame comprises side frames 6 which are resiliently supported from the truck axles by means of springs 7 and axle bearings 8. The jack shaft is supported from the frame by means of bearings 8ª.

The driving motor comprises a stationary frame 9 to which a substantially cylindrical laminated core member 10, having a plurality of inwardly projecting pole pieces (not shown), is secured, end housings 11 which are similar to each other and are removably attached to opposite ends of the stationary frame 9, a driving shaft 12 which is rotatably mounted in bearings 13 that are rigidly mounted on the end housings and engage the shaft near its ends, a hollow cylinder 14 which is keyed to the shaft and forms an annular projection from its middle point, and a rotatable armature member 15 comprising a spider 16, a cylindrical laminated core member 17, a winding 18, a commutator 19, sleeves or quills 20 which fit loosely over the ends of the shaft and are secured to the spider 16 and bearing members 21 interposed between the outer cylindrical surfaces of the quills or sleeves and the end brackets for maintaining a concentric relation between the stationary and rotatable parts of the motor. A driving connection is established between the shaft and the rotating part of the motor by means of a plurality of cylinders 22 which project through pockets 23 in the cylindrical member 14 and are separated from the walls of the pockets by helical springs 24 the adjacent turns of which are eccentric.

The extreme ends of the shaft are provided with cranks 25 and crank pins 26 which are counter-balanced in the usual manner, and an operative connection is established between the shaft 12 and the jack shaft 5 by means of connecting rods 27, similar crank pins 28 being secured to the jack shaft for this purpose.

As already pointed out, the truck frame is resiliently mounted upon the truck axles and the end housings of the motor are supported directly over the side plates of the truck frame, consequently, the weight of the stationary part of the motor is borne directly by the truck frame. By reason of the bearings 21 which maintain the concentric relation between the stationary and rotating parts of the motor, the weight of the rotating part is also indirectly supported upon the truck frame. The shaft member, in addition to the rotating parts of the motor, is supported from the end housing but there is no direct rigid connection between the shaft 12 and the rotating part 15 of the machine, so that the wear which usually occurs in the bearings 13, since they take up the thrust due to the re-action of the crank shafts 27 when the motor is in operation, does not in any way effect the concentric relation between the stationary and rotating parts of the motor, nor are the irregularities in the motor torque as prominent in the jack shaft and in the wheels 2, to which it is connected by connecting rods 29, as would otherwise be the case. The advantages of interposing a resilient connection between the driving shaft and the rotating part of the motor are well known, and it will be readily understood by those skilled in the art that the arrangement illustrated and described is specially adapted for the heavy service for which it is intended.

Since the details of the windings and the magnetically active parts of the motor are immaterial to my invention, I deem it unnecessary to describe them specifically.

It is conceivable that other means for establishing a resilient connection between the shaft and the motor armature may be utilized in lieu of that illustrated and that various other structural modifications may be effected within the spirit and scope of my invention.

I claim as my invention:

1. In an electrically propelled vehicle, the combination with a truck axle and a driving shaft operatively connected thereto, of a motor comprising a rotatable part resiliently connected to the driving shaft near its middle point, a stationary part having bearings for taking the driving thrust and independent means for maintaining a concentric relation between the two parts.

2. In an electrically propelled vehicle, the combination with a truck axle and a driving shaft operatively connected thereto, of a motor comprising a rotatable part resiliently connected to the driving shaft near its middle point, a stationary part having driving shaft bearings for taking the driving stresses, and means independent of the resilient connection between the driving shaft and the axle and independent of the driving shaft bearings for maintaining a concentric relation between the stationary and rotatable parts of the motor.

3. A vehicle comprising a truck axle, a truck frame resiliently mounted thereon, an electric motor comprising a stationary part rigidly secured to the truck frame, two sets of bearings mounted on the stationary member of the machine, a driving shaft mounted in one set of bearings and operatively connected to the truck axle, a rotatable part of the motor mounted in the other set of bearings, and a resilient connection between the rotatable part and the shaft.

4. An electric motor comprising a stationary member having two sets of bearings, a rotatable member mounted in one set of bearings, a driving shaft mounted in the other set of bearings, and a resilient connection between the rotatable member and the driving shaft, one set of said bearings being adapted to receive the driving strains and to relieve the other set.

5. An electric motor comprising a stationary frame, end housings secured thereto having two concentric sets of bearings, a movable part rotatably mounted in one set of bearings, and a driving shaft rotatably mounted in the other set of bearings, and means for providing a yielding connection between the driving shaft and the rotatable part of the motor, whereby a concentric relation between the rotatable and stationary parts of the motor is maintained irrespective of the wear on the shaft bearings.

6. An electric motor comprising a stator, end plates or housings therefor, each having an outer and an inner bearing member, a rotor having sleeves or quills rotatably mounted in the inner bearings and a shaft extending loosely through the quills or sleeves and rotatably mounted within the outer bearings, and a yielding connection between the driving shaft and the sleeves or quills.

7. An electric motor comprising a stator, end housings therefor, each having an outer and an inner bearing member, a rotor having sleeves or quills rotatably mounted in the inner bearings and a shaft extending loosely through the quills and rotatably mounted within the outer bearings, and a plurality of interposed springs between the sleeves or quills and the shaft.

8. An electric motor comprising a stator, end housings therefor, each having an inner and an outer bearing, a rotor, a pair of sleeves or quills secured thereto having adjacent annular end flanges, a shaft having an annular projection at the middle point extending between the end flanges of the quills through which the ends of the shaft extend, said shaft being rotatably mounted in the outer bearings and having a plurality of cylindrical pockets in its annular projection and said quills being rotatably mounted in the inner bearings and joined by cylinders which extend through the pockets in the shaft projection and being separated therefrom by helical springs, the adjacent turns of which are eccentric.

9. In an electric vehicle, the combination with a frame and a motor having stationary and rotatable parts, of a crank shaft driven by the rotatable part, and two sets of bearings in the stationary part for respectively maintaining a suitable relation between the stationary and rotatable parts and for receiving the driving thrusts communicated through the crank shaft.

10. In an electric vehicle, the combination with a frame and a motor having stationary and rotatable parts, of a shaft driven by the rotatable part and relatively immovable concentric bearings for respectively maintaining a suitable relation between the stationary and rotatable parts and for receiving the driving thrusts communicated through the shaft.

11. In an electric vehicle, the combination with a truck axle, a truck frame resiliently mounted thereon, an electric motor comprising stationary and rotatable parts and a driving shaft, and driving connections between said shaft and the truck axle, of two concentric bearings in the stationary part for respectively maintaining a concentric relation between the stationary and rotatable parts and for receiving the thrusts communicated through the driving shaft.

12. In an electric vehicle, the combination with a truck axle, a truck frame resiliently mounted thereon, and an electric motor comprising stationary and rotatable parts and a driving shaft, of a jack shaft rotatively supported in the frame, operative connections between the motor shaft and the jack shaft and between the jack shaft and the axle, and two concentric bearings in the stationary part for respectively maintaining a concentric relation between the stationary and rotatable parts and for receiving the thrusts communicated through the driving shaft.

13. In an electric vehicle, the combination with a truck axle, a truck frame resiliently mounted thereon, and an electric motor comprising stationary and rotatable parts and a driving shaft, of a jack shaft rotatively supported at one side of the truck axle and operatively connected thereto, a side rod connection between the jack shaft and the motor shaft, and two concentric bearings in the stationary part for respectively maintaining a concentric relation between the stationary and rotatable parts and for receiving the thrusts communicated through the driving shaft.

14. In an electric vehicle, the combination with a pair of truck axles and a jack shaft rotatively supported between them and operatively connected thereto by side rod connections, of a motor having stationary and rotatable parts and a crank shaft, and concentric bearings in the stationary part for respectively maintaining a concentric relation between the stationary and rotatable parts and for receiving the driving thrusts communicated through the crank shaft.

15. An electric vehicle comprising a frame, an electric motor rigidly secured thereto and comprising stationary and rotatable parts and a driving shaft, a jack-shaft rotatably supported in the vehicle frame and operatively connected to the driving shaft, and two concentric bearings in the stationary part of the motor for respectively maintaining a concentric relation between the stationary and rotatable parts and for receiving the thrusts communicated through the driving shaft.

In testimony whereof, I have hereunto subscribed my name this 31st day of August, 1908.

GEORGE M. EATON.

Witnesses:
  Jos. L. C. Doon,
  Birney Hines.

---

Copies of this patent may be obtained for five cents each, by addressing the "Commissioner of Patents, Washington, D. C."